United States Patent
Vervelde et al.

(10) Patent No.: US 11,891,516 B2
(45) Date of Patent: Feb. 6, 2024

(54) TIRE COMPOSITION AND METHOD FOR MAKING THEREOF

(71) Applicant: Kraton Polymers LLC, Houston, TX (US)

(72) Inventors: Jochem H. W. Vervelde, Almere (NL); Jeremie G. Pichereau, Almere (NL); Jeroen van Herrikhuyzen, Almere (NL); Mark Schaapman, Almere (NL); Pieter Eduard, Almere (NL)

(73) Assignee: KRATON CORPORATION, Houston, TX (US)

( * ) Notice: Subject to any disclaimer, the term of this patent is extended or adjusted under 35 U.S.C. 154(b) by 211 days.

(21) Appl. No.: 17/644,405

(22) Filed: Dec. 15, 2021

(65) Prior Publication Data

US 2022/0195155 A1  Jun. 23, 2022

Related U.S. Application Data

(60) Provisional application No. 63/199,335, filed on Dec. 21, 2020.

(51) Int. Cl.
| | |
|---|---|
| *C08K 3/36* | (2006.01) |
| *C08K 3/04* | (2006.01) |
| *C08K 3/22* | (2006.01) |
| *C08K 5/5419* | (2006.01) |
| *C08K 5/09* | (2006.01) |
| *B60C 1/00* | (2006.01) |
| *C08J 3/18* | (2006.01) |
| *C08L 93/04* | (2006.01) |
| *C08L 9/06* | (2006.01) |

(52) U.S. Cl.
CPC ............. *C08L 9/06* (2013.01); *B60C 1/0016* (2013.01); *C08J 3/18* (2013.01); *C08K 3/04* (2013.01); *C08K 3/22* (2013.01); *C08K 3/36* (2013.01); *C08K 5/09* (2013.01); *C08K 5/5419* (2013.01); *C08J 2309/06* (2013.01); *C08J 2493/04* (2013.01); *C08K 2003/2296* (2013.01)

(58) Field of Classification Search
CPC ... C08K 3/36; C08K 3/04; C08K 3/22; C08K 5/5419; C08K 5/09; B60C 1/00; C08J 3/18; C08L 93/04
USPC .......................................................... 523/156
See application file for complete search history.

(56) References Cited

U.S. PATENT DOCUMENTS

| | | |
|---|---|---|
| 7,737,204 B2 | 6/2010 | Sandstrom |
| 10,738,178 B2 | 8/2020 | Sakurai |
| 2016/0251503 A1* | 9/2016 | Chenchy ................. C08K 5/548 524/271 |
| 2020/0317890 A1 | 10/2020 | Hatanaka |
| 2021/0189132 A1 | 6/2021 | Van Herrikhuyzen et al. |

FOREIGN PATENT DOCUMENTS

EP       0149957       * 7/1985

* cited by examiner

*Primary Examiner* — Deve V Hall

(57) ABSTRACT

The disclosure relates to a composition for use in tires. The rubber composition comprises a blend of a rubber component and based on 100 parts by weight (phr) of the rubber component, from 50 to 200 phr of a filler, from 0 to 25 phr of a plasticizer, and from 5 to 90 phr dimeric decarboxylated rosin (DDCR). The DDCR resin comprises 50 to 100 wt. % of polycyclic hydrocarbon compounds having one or more aliphatic, unsaturated, or aromatic groups, and 34-80 carbon atoms, with a molecular weight $M_n$ of 250-900 Da, a polydispersity index of 1.0-1.35, and an oxygen to carbon ratio of <5%.

20 Claims, No Drawings

TIRE COMPOSITION AND METHOD FOR MAKING THEREOF

RELATED APPLICATIONS

This application claims priority from U.S. Provisional Application No. 63/199,335, with filing date of Dec. 21, 2020, the entire disclosure of which is incorporated herein by reference.

FIELD

The present disclosure relates to compositions for use in tire applications and methods for making thereof.

BACKGROUND

Rubber tires, desirably have a rubber tread possessing attributes such as superior wet grip (wet traction) and rolling resistance, e.g., the force resisting the motion when a tire rolls on a surface. While dry grip is usually maintained by many rubber compositions, satisfactory wet grip is often not achieved. Rubber compositions having good wet grip improve wet skid resistance, but suffer from an increase in rolling resistance, the latter contributing to decreased fuel economy.

The two attributes, lower rolling resistance and higher wet grip performance, are influenced by properties that generally conflict with each other. In optimizing a tread for rolling resistance, the wet grip is often compromised; and when optimizing for wet grip, the rolling resistance is often negatively affected. For example, the use of resin (additives) is known to improve wet grip but can be disadvantageous to rolling resistance.

Therefore, there is a still a need for an improved resin to improve both wet grip and rolling resistance in a rubber composition.

SUMMARY

In one aspect, a rubber composition is disclosed. The composition comprises, consists essentially of, or consists of a blend of a rubber component and based on 100 parts by weight (phr) of the rubber component, from 50 to 200 phr of a filler, from 0 to 25 phr of a plasticizer, and from 5 to 90 phr dimeric decarboxylated rosin (DDCR) resin. The DDCR resin comprises, consists essentially of, or consists of 50 to 100 wt. % of polycyclic hydrocarbon compounds having one or more aliphatic, unsaturated, or aromatic groups, and 34-80 carbon atoms. The DDCR resin is characterized as having a molecular weight $M_n$ of 250-900 Da, a polydispersity index of 1.0-1.35, and an oxygen to carbon ratio of <5%. The DDCR resin is formed by decarboxylating a dimeric rosin acid or by dimerizing a decarboxylated rosin.

In another aspect, a method for preparing a rubber composition is disclosed. The method comprises, consists essentially of, or consists of providing 0-100 parts by weight (phr) of a rubber component, providing from 5 to 90 phr of a dimeric decarboxylated rosin (DDCR) resin, providing from 50 to 200 phr of a filler, and optionally up to 75 phr of a plasticizer, mixing the rubber component, the DDCR resin, the filler, and the optional plasticizer to form a mixture, kneading the mixture, and incorporating a cross-linking system into the kneaded mixture to form the tire rubber composition. The DDCR resin comprises, consists essentially of, or consists of 50 to 100 wt. % of polycyclic hydrocarbon compounds having one or more aliphatic, unsaturated, or aromatic groups, and 34-80 carbon atoms. The DDCR resin is characterized as having a molecular weight Mn of 250-900 Da, measured using gel permeation chromatography and polystyrene calibration standards, a polydispersity index of 1.0-1.35, and an oxygen to carbon ratio of <5%. The DDCR resin is formed by decarboxylating a dimeric rosin acid or by dimerizing a decarboxylated rosin.

DESCRIPTION

The following terms will have the following meanings unless otherwise indicated.

"At least one of [a group such as A, B, and C]" or "any of [a group such as A, B, and C]" or "selected from [a group such as A, B, and C]" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C. In another example, at least one of A and B means A only, B only, as well as A and B. A list of embodiments presented as "A, B, or C" is to be interpreted as including the embodiments, A only, B only, C only, "A or B," "A or C," "B or C," or "A, B, or C."

"phr" means parts per hundred parts of diene elastomer (rubber).

"Elastomer" may be used interchangeably with the term "rubber," referring to any polymer or combination of polymers consistent with ASTM D1566 definition.

"Polymer" and "interpolyrner" are used interchangeably to mean higher oligomers having a number average molecular weight (Mn) equal to or greater than 100, prepared by the polymerization or oligomerization of at least two different monomers, including copolymers, terpolymers, tetrapolymers, etc.

$M_w$ is the molecular weight average distribution calculated according to:

$$M_w = \frac{\Sigma_i N_i M_i^2}{\Sigma_i N_i M_i}$$

where $N_i$ is the number of molecules of molecular weight $M_i$. $M_w$ can be determined using GPC-SEC per ASTM D5296 (2005).

$M_n$ is the number average of the molecular weights, calculated according to:

$$M_n = \frac{\Sigma_i N_i M_i}{\Sigma_i N_1}$$

where $N_i$ is the number of molecules of molecular weight $M_i$. $M_n$ can be determined using GPC-SEC per ASTM D5296 (2005).

$M_z$ is a higher order molecular weight average, or the third power molecular weight, which is calculated according to:

$$M_z = \frac{\Sigma_i N_i M_i^3}{\Sigma_i N_i M_i^2}$$

where $N_i$ is the amount of substance of species i and $M_i$ is the molecular weight of species i. $M_z$ can be determined using GPC-SEC per ASTM D5296 (2005).

Polydispersity index (PDI) is calculated according to: $PDI=M_w/M_n$.

Tg (glass transition) can be determined according to ASTM D 6604 (2013).

$T_{sp}$ (softening point) can be determined by ASTM E28, or a ring and ball, or ring and cup softening point tests.

Acid values can be measured using ASTM D1240-14 (2018).

Properties such as tensile strength, elongation, and modulus can be measured following procedures described in ASTM D412 or ISO 37.

Hardness refers to Hardness Shore A according to DIN 53506.

Density can be measured using ASTM D792-13.

GPC molecular weights can be measured against polystyrene calibration standards using a triple detector array and a mixed column set.

Mooney viscosity MS or ML (1+4) at 100° C. can be measured according to DIN 53523.

DIN abrasion resistance can be measured according to ISO 4649.

One method of characterizing viscoelastic polymeric materials is by measuring its complex modulus, defined as: $G^*=G'+iG''$; where G' and G" are the storage modulus and loss modulus, respectively, and "i" is the imaginary unit. Storage modulus G' and loss modulus G" may be measured by dynamic mechanical analysis (DMA). G' is associated with energy storage and release during periodic deformation, and G" is associated with the dissipation of energy and its transformation into heat. G' and G" allow comparisons of a materials ability to return energy to its ability to lose energy. Complex modulus, $|G^*|$, is also defined as $[(G')^2+(G'')^2]^{1/2}$, representing ratio of maximum stress to maximum strain ($\alpha°/\varepsilon°$).

Dynamic mechanical properties, e.g., storage modulus (G'), loss modulus (G"), and phase angle ($\delta$), and damping can be measured via dynamic mechanical analysis (DMA) between −100° C. and +100° C., as a function of strain amplitude, per ASTM D7605, giving an indication of durability, traction, and handling. The magnitudes of the storage modulus (G') at −20° C. and −30° C. are used as indicators for ice grip. Tan $\delta$ is a ratio of energy lost as heat (loss modulus) versus the energy stored and released (storage modulus), or G"/G', where $\delta$ is the phase angle between the applied force and the materials response to that force. A larger tan $\delta$ indicates a large loss modulus and consequently a dampened rate of rebound. Wear indicator is given by the magnitude of volume loss of material resulting after being subjected to wear, relative to an initial volume. Tan $\delta$ can be measured using DMA, with a dynamic viscoelastic tester and temperature sweep in double shear mode from −60° C. to +100° C., a heat rate of 1° C./min at 10 Hz, a dynamic strain of 0.1% (from −60° C. to −5° C.) and a dynamic strain of 3% (from −5° C. to 100° C.). Tan $\delta$ at 100° C. indicating tire grip and other enhanced performance characteristics under extreme use conditions. Wet grip indicator commonly used is tan $\delta$ at 0° C., rolling resistance indicator commonly used is tan $\delta$ at 60° C. The magnitude of tan $\delta$ at −20° C. can be used as an indicator for snow grip.

Disclosed herein is a rubber composition that can be used for a number of applications, including tires. The rubber composition comprises a rubber, a resin, an optional plasticizer, and a filler. The resin is a dimeric decarboxylated rosin (DDCR).

Resin Component—DDCR: The resin component is a dimeric decarboxylated rosin (DDCR), comprising one or more polycyclic compounds in amount of 50-100 wt. %, containing one or more aliphatic, unsaturated, or aromatic groups having 34-80 carbon atoms, or 34-60, or 34-40 carbon atoms, or 36-38 carbon atoms. Examples of polycyclic compounds include but are not limited to dimers, trimers, and higher oligomers/polymers. In embodiments, the DDCR resin comprises polycyclic compounds having exemplary structures as shown as (I) and (II):

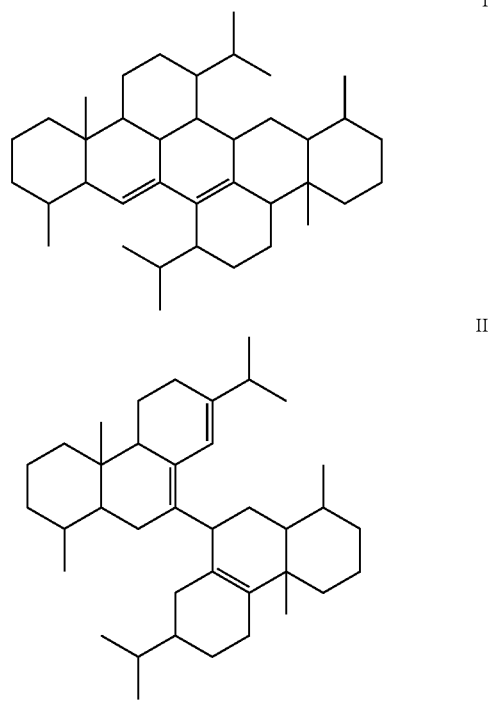

The DDCR resin comprises mostly dimeric and trimeric species, with the sum of the dimeric and trimeric species of >=75 wt. %, or >=80 wt. %, or >=85 wt. %, or >=90 wt. %, or >=95 wt. %, or >=99 wt. %, or 75-99.9 wt. %, or 75-98 wt. %, or 80-97 wt. %. In embodiments, the DDCR resin is primarily dimeric species in an amount of >=50 wt. %, or >=60 wt. %, or >=70 wt. %, or >=80 wt. % or >=90 wt. %, or >=95 wt. %, or >=99 wt. %, or 50-99.9 wt. %, or 60-99.9 wt. %, or 70-95 wt. %, or 70-90 wt. %. In embodiments, the DDCR resin is primarily trimeric species in an amount
of >=50 wt. %, or >=60 wt. %, or >=70 wt. %, or >=80 wt. % or >=90 wt. %, or >=95 wt. %, or >=99 wt. %, or 50-99.9 wt. %, or 60-99.9 wt. %, or 70-95 wt. %, or 70-90 wt. %. The remainder of the DDCR resin can be monomeric species and/or larger polymeric groups.

In embodiments, the DDCR resin is prepared by decarboxylating dimeric rosin acid (DRA) and isolating purified forms of DDCR therefrom. In a second embodiment, the DRA is first prepared in-situ from a rosin acid starting material. The in-situ formed DRA is subsequently decarboxylated, generating a crude DDCR for subsequent isolation/purification, generating the DDCR resin. In a third embodiment, a rosin acid is first decarboxylated, and the formed decarboxylated rosin is subsequently dimerized, generating a crude DDCR. The crude DDCR is subsequently isolated/purified in one or more steps, for example by separation on differences in boiling point, e.g., by fractional distillation, evaporation such as wiped-film evaporation, or combinations thereof.

In embodiments, the DDCR is either unhydrogenated, partially hydrogenated, or hydrogenated.

In embodiments, the DDCR resin can be single or dual-functionalized with a hydrosilylation agent, e.g., with a compound (cyclic or non-cyclic) having a Si—H bond that catalytically reacts with the backbone of DDCR resin. The DDCR resin component can be used as an extender for the rubber composition.

In embodiments, DDCR resin is used in combination with other known resins, e.g., substituted or unsubstituted units derived from cyclopentadiene homopolymer or copolymer resins ("CPD"), dicyclopentadiene homopolymer or copolymer resins ("DCPD"), terpene homopolymer or copolymer resins, rosin derived resins, rosin/rosin esters, pinene homopolymer or copolymer resins, C5 fraction homopolymer or copolymer resins, C9 fraction homopolymer or copolymer resins, α-methylstyrene homopolymer or copolymer resins, and combinations thereof.

In embodiments, the DDCR resin has molar masses (Mn) ranging from 250-900 Da, or 300-600 Da, or 350-450 Da, or 380-420 Da (versus polystyrene calibration standards), measured using GPC with a triple detector array and a mixed column set.

In embodiments, the DDCR resin exhibits a polydispersity index (PDI) (GPC) of 1.0-1.35, or 1.0-1.34, or 1.0-1.33, or 1.0-1.32, or 1.0-1.31, or 1.0-1.30, or 1.0-1.2, or 1.05-1.15.

In embodiments, the DDCR resin has a glass transition temperature ($T_g$) of >−20° C., or >−10° C., or >0° C., or >15° C., or −20-110° C., or 0-90° C., or 15-75° C., or 25-70° C., or <110° C., or <100° C., or <90° C., or <80° C., or <70° C. measured with Differential Scanning Calorimetry per ASTM E1356.

In embodiments, the DDCR resin exhibits a $T_g/M_n$ ratio (K/Da) of >0.6, or 0.6-1.0, or 0.65-0.9, or 0.7-0.85, or <0.85.

In embodiments, the DDCR resin has an acid value of <80 mg KOH/g, or <50 mg KOH/g, or <40 mg KOH/g, or <30, mg KOH/g, or <25 mg KOH/g, or <15 mg KOH/g, or <5 mg KOH/g, or 0-80 mg KOH/g, or 0-50 mg KOH/g, or 0-25 mg KOH/g, or 0-20 mg KOH/g, or 0-10 mg KOH/g, or 1-15 mg KOH/g, or 0-5 mg KOH/g, per ASTM D-465.

The DDCR resin is solid, having a ring and ball softening point of >30° C., >35° C., >40° C., or >50° C., or >60° C., or >70° C., or >75° C., or 30-160° C., or 50-125° C., or 60-120° C., or 70-120° C., or 75-120° C., <160° C., or <125° C., or <120° C. measured per ASTM E28-18.

In embodiments, the DDCR resin has a Gardner color (neat) from >18, or >10, or >5 or >2 or 0-18, or 1-14, or 2-10, per ASTM D6166. In embodiments with a hydrogenated DDCR, the DDCR resin has a Gardner color of <18, <12, or <8, or <5, or 0-18, or 1-14, or 2-10.

In embodiments, the DDCR resin has a Brookfield viscosity of >15 mPa·s, or >20 mPa·s, or >25 mPa·s, or 15-1000 mPa·s, or 20-750 mPa·s, or 25-500 mPa·s, or 35-250 mPa·s, of <1000 mPa·s, or <750 mPa·s, or <500 mPa·s, or <250 mPa·s measured at 177° C. per ASTM D2196.

In embodiments, the DDCR resin has a flash point of >150° C. or >175° C. per ASTM D 92.

In embodiments, the DDCR resin has a density of 1.00-1.05, or 1.00-1.04, or 1.01-1.03, or 1.015-1.025 g/cm$^3$.

In embodiments, the DDCR resin is characterized as having an oxygen content of <5%, or <3%, or <2%, or 0-5%, or 0-4%, or 0-3%, or 0-2%, or 0-1%. Oxygen content (in %) in the DDCR is calculated as the oxygen to carbon ratio—or the sum of oxygen atoms present divided by sum of carbon atoms present in DDCR, with the number of oxygen and carbon atoms being obtained from elemental analyses.

In embodiments, the DDCR resin displays a low cloud point in polyolefins, indicating high compatibility with nonpolar polymers. In embodiments, the DDCR resin displays a cloud point in polyolefins of <70° C., or <60° C., or <50° C., or <40° C., or >−30° C., or >−15° C., or −30-70° C., or −20-65° C., or −10-60° C., or 0-50° C. wherein the starting DRA materials are not miscible over a temperature range of 0-200° C.

The DDCR resin component can be used alone or in combination of two or more resins thereof, in an amount ranging from 1-90 phr; or from 5-80 phr; or from 10-50 phr. In embodiments, the rubber composition includes any of 5, 10, 15, 20, 25, 30, 35, 40, 45, 50, 55, 60, 65, 70, 75, 85, or in any range between of foregoing numbers.

Rubber Component: The term "rubber" or "elastomer" include both natural rubber and its various raw and reclaim forms, as well as various synthetic rubbers. In embodiments, the rubber component comprises any of unsaturated diene elastomer selected from polybutadienes, natural rubber, synthetic polyisoprenes, butadiene copolymers, isoprene copolymers and mixtures thereof.

In embodiments, the rubber is selected from butyl rubber, halogenated butyl rubber, EPDM (Ethylene Propylene Diene Monomer rubber), and mixtures thereof. In another embodiment, the rubber component is selected from natural rubber (NR), styrene-butadiene rubber (SBR), butadiene rubber (BR), synthetic polyisoprene rubber, epoxylated natural rubber, polybutadiene rubber, nitrile-hydrogenated butadiene rubber HNBR, hydrogenated SBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

Examples of SBR rubber include an emulsion-polymerized styrene-butadiene rubber (un-modified E-SBR), a solution-polymerized styrene-butadiene rubber (un-modified S-SBR) and modified SBRs obtained by modifying terminals thereof (modified E-SBR and modified S-SBR) can be used. In embodiments, the rubber component comprises rubber components other than the SBR and the BR such as a natural rubber (NR), an isoprene rubber (IR), an epoxidized natural rubber (ENR), a butyl rubber, an acrylonitrile butadiene rubber (NBR), an ethylene propylene diene rubber (EPDM), a chloroprene rubber (CR) a styrene-isoprene-butadiene rubber (SIBR), used alone or in combinations as needed.

The rubber component may be coupled, star-branched, branched, and/or functionalized with a coupling and/or star-branching or functionalization agent. The branched rubber can be any of branched ("star-branched") butyl rubber, halogenated star-branched butyl rubber, poly(isobutyleneco-p-methylstyrene), brominated butyl rubber, chlorinated butyl rubber, star-branched polyisobutylene rubber, and mixtures thereof.

In embodiments, the rubber is end-group functionalized to improve its affinity for fillers, such as carbon black and/or silica. Examples of coupling/functional groups include C—Sn bond or aminated functional groups, e.g., benzophenone; silanol functional groups or polysiloxane functional groups having a silanol end; alkoxysilane groups, and polyether groups.

Fillers: The rubber composition further includes 30 to 200 phr, or 30-150 phr, phr fillers. Examples include, but are not limited to, calcium carbonate, carbon nanotube, clay, mica, silica, silicates, talc, titanium dioxide, alumina, zinc oxide, starch, wood flour, carbon black, or mixtures thereof. The fillers may be any size, e.g., from 0.0001 m to 100 m.

Other filler examples include ultra-high molecular weight polyethylene (UHMWPE), particulate polymer gels, and plasticized starch composite fillers known in the art.

In embodiments, the fillers are surface-treated, e.g., coated or blended with a resin as described above, or coated or reacted with organo silane species.

Coupling Agents: In embodiments, the rubber composition further comprises coupling agents. "Coupling agent" is meant to refer to any agent capable of facilitating stable chemical and/or physical interaction between two otherwise non-interacting species, e.g., between a filler such as silica and an elastomer. Coupling agents cause silica to have a reinforcing effect on the rubber. In embodiments, the coupling agent is a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur.

In embodiments, the coupling agent is bifunctional. Examples include organosilanes or polyorgano-siloxanes. Other examples of suitable coupling agents include silane polysulfides. The coupling agent can also be bifunctional polyorganosiloxanes, or hydroxysilane polysulphide. The coupling agent can also include other silane sulphides, e.g., silanes having at least one thiol (—SH) functional group (referred to as mercaptosilanes) and/or at least one masked thiol functional group. The coupling agent can also include combinations of one or more coupling agents described herein. In embodiments, the coupling agent is an alkoxysilane or polysulphurized alkoxysilane, e.g., polysulphurized alkoxysilane.

The coupling agent is present in an amount from 1 to 20 phr, or 1 to 10 phr, or 3 to 15 phr.

Optional Plasticizer Component: "Plasticizer" (also referred to as a processing oil), refers to a petroleum derived processing oil and synthetic plasticizer to extend elastomers and improve the processability of the composition. Suitable plasticizers include, but are not limited to, aliphatic acid esters, hydrocarbon processing oils, tall oil pitch and modified tall oil pitch, and combinations thereof.

In embodiments, the plasticizer is a modified tall oil pitch selected from the group of a pitch ester, a decarboxylated tall oil pitch, a soap of tall oil pitch, a thermally treated tall oil pitch, and a thermally and catalytically treated tall oil pitch.

In embodiments, the plasticizer includes both extending oil present in the elastomers, and process oil added during compounding. Suitable process oils include aromatic, paraffinic, naphthenic, and low PCA oils, such as MES, TDAE, and heavy naphthenic oils, and vegetable oils such as sunflower, soybean, and safflower oils. Examples of low PCA oils include those having a polycyclic aromatic content of less than 3 percent by weight. Suitable vegetable oils include, for example, soybean oil, sunflower oil and canola oil which are in the form of esters containing a certain degree of unsaturation.

In embodiments, the plasticizer is present in an amount of 0-25 phr, or 5-15 phr. In another embodiment, the plasticizer is present in an amount of weight ratio of resin to plasticizer of >1, or >3, or >6.

Cross-Linking Agents: In embodiments, the rubber component in the composition may be crosslinked by adding curative agents, e.g., sulfur, metals, metal oxides such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The cross-linking agent content is present in an amount of 0.3-10 phr, or 0.5-5.0 phr, or >0.3 phr, or >0.5 phr, or <15 phr, or <10 phr, or <8 phr, or <5 phr.

Other Additives: The composition can be compounded with other components known in the art in amounts of up to 10 phr, e.g., sulfur donors, curing aids, such as accelerators, activators and retarders and processing additives, pigments, fatty acid, zinc oxide, waxes, antioxidants and antiozonants and peptizing agents.

Methods for Forming Tire Rubber Compositions: The tire compositions can be formed by methods known in the rubber mixing art. The formulations were mixed in a 379 ml Banbury type internal mixer using a 3-stage mixing protocol known in the art. For example, the components are typically mixed in two stages, e.g., at least one non-productive stage followed by a productive mix stage. The final curatives, e.g., sulfur-vulcanizing agents are typically mixed in a final stage which is conventionally called the "productive" mix stage in which the mixing typically occurs at a temperature, lower than the mix temperature(s) used in the preceding non-productive mix stage(s).

The tire composition can be subjected to a thermomechanical mixing step, generally comprising a mechanical working in a mixer or extruder for a time suitable to produce a rubber temperature of 140° C.-190° C. The duration of the thermomechanical working varies as a function of the operating conditions, volume, and nature of the components. For example, the thermomechanical working may be 1-20 minutes.

Properties: The tire compositions comprising the DDCR resin show reduction in rolling resistance and improvement in wet grip performance.

In embodiments, tire tread compositions comprising the DDCR resin show similar wet grip, tan $\delta$ at 0° C., and a lower rolling resistance as represented by tan $\delta$ value at 60° C., which is >5% lower, or >10% lower, or >15% lower when compared to tire tread compositions containing similar amounts of alpha-methyl styrene resin (AMS).

In embodiments, tire tread compositions comprising the DDCR resin show similar wet grip, tan $\delta$ at 0° C., and a lower rolling resistance as represented by tan $\delta$ value at 60° C., which is >5% lower, or >10% lower, or >15%, or >20% lower when compared to tire tread compositions containing similar amounts of dimer rosin acid.

In embodiments, tire tread compositions comprising the DDCR resin show improved wet grip as represented by tan $\delta$ value at 0° C., of >5% higher, or >10% higher, or >15% higher when compared to tire tread compositions containing similar amounts of treated distillate aromatic extract oil.

In embodiments, the tire tread composition comprising the DDCR resin has a wet grip resistance to rolling resistance indicator ratio (tan δ at 0° C./tan δ at 60° C.) of >5% higher, or >10% higher, or >15% higher, or >20% higher, than a tire tread composition containing a comparable amount of AMS.

In embodiments, the tire tread composition comprising the DDCR resin has a wet grip resistance to rolling resistance indicator ratio (tan δ at 0° C./tan δ at 60° C.) >20% higher, or >30% higher, or >40% higher, or >50% higher, than a tire tread composition containing a comparable amount of dimer rosin acid.

In embodiments, the tire tread composition comprising the DDCR resin has a wet grip resistance to rolling resistance indicator ratio (tan δ at 0° C./tan δ at 60° C.) >5% higher, or >10% higher, or >15% higher, or >20% higher, or >25% higher, than a tire tread composition containing a comparable amount of treated distillate aromatic extract oil.

In embodiments, tire tread compositions comprising the DDCR resin show lower storage modulus, G' at 60° C., that is <3% less, or <5% less, or <10% less, or <15%, or <20% less, when compared to tire tread compositions containing similar amounts of AMS.

In embodiments, tire tread compositions comprising the DDCR resin show lower loss modulus, G" at 60° C., that is >5% less, or >10% less, or >20% less, or >30%, or >40% less, when compared to tire tread compositions containing similar amounts of AMS.

Applications: Besides tire applications, the composition can be extruded, compression molded, injection molded, or laminated into various shaped articles such as fibers, films, laminates, layers, and industrial parts such as automotive parts, appliance housings, consumer products, packaging, and the like.

In tire applications, the rubber compositions are useful for producing a variety of tires such as truck tires, bus tires, automobile tires, motorcycle tires, off-road tires, aircraft tires, and the like. The rubber compositions can also be fabricated into a component of a tire, e.g., treads, sidewalls, chafer strips, tire gum layers, reinforcing cord coating materials, cushion layers, and the like. The rubber compositions can also be useful in other applications, e.g., curing bladders, inner tubes, air sleeves, hoses, belts, footwear components, rollers, vibration isolation devices, adhesives, caulks, sealants, glazing compounds, protective coatings, air cushions, pneumatic springs, air bellows.

The rubber composition can also be used for producing molded rubber parts, such as automobile suspension bumpers, auto exhaust hangers, and body mounts. In yet other applications, the rubber compositions can also be used in medical applications, such as pharmaceutical stoppers and closures, and coatings for medical devices.

Examples: The following illustrative examples are intended to be non-limiting.

In the examples, the resins described in Table 1 below were incorporated into tire tread compositions as shown in Table 2 and tested for their performance.

The tire tread compositions were mixed in a 379 ml Banbury type internal mixer using a 3-stage mixing protocol known in the art.

The performance properties of the tire tread compositions are in Table 3 below.

Determination of tan δ was carried out by DMA in temperature-sweep/mode in double shear mode from −60° C. to +100° C. with a heat rate of 1° C./min at 10 Hz, a dynamic strain of 0.1% (from −60° C. to −5° C.), and a dynamic strain of 3% (from −5° C. to 100° C.) using a Metravib+450N. Properties such as tensile strength, elongation, and modulus were measured following procedures described in ISO 37. DIN abrasion resistance was measured according to ISO 4649 using a DIN abrasion tester.

TABLE 1

| | Description | Tg (° C.) | Tsp (° C.) | Acid Value (mg KOH/g) | Density (g/cm3) | Color (Gardner) | Mn (DA) | PDI | Tg/Mn ratio (K/Da) | Dimer content (%) | Trimer content (%) |
|---|---|---|---|---|---|---|---|---|---|---|---|
| Reference 1 | alpha methyl styrene resin | 41 | 85 | 0 | 1.061 | 1 | 700 | 1.7 | 0.45 | N/A | N/A |
| Reference 2 | Dimer Rosin Acid | 50 | 102 | 140 | 1.068 | 10 | 344 | 1.3 | 0.94 | 32.7 | 2.2 |
| Reference 3 | Treated distillatearomatic extract oil | −24 | — | 0 | 0.959 | >18 | N/A | N/A | N/A | N/A | N/A |
| Reference 4 | Hydrocarbon resin | 50 | 103 | 0 | 1.059 | 1.5 | 437 | 1.6 | 0.74 | N/A | N/A |
| Example 1 | Dimeric Decarboxylated Rosin | 56 | 100 | 1 | 1.022 | >18 | 414 | 1.08 | 0.79 | 81.1 | 10.3 |
| Example 2 | Dimeric Decarboxylated Rosin | 59 | 104 | 1 | 1.023 | >18 | 415 | 1.09 | 0.8 | 81.8 | 12.9 |
| Example 3 | Dimeric Decarboxylated Rosin | 63 | 109 | 2 | 1.018 | >18 | 388 | 1.09 | 0.87 | 82.6 | 10.4 |
| Example 4 | Dimeric Decarboxylated Rosin | 52 | 99 | 2 | 1.025 | >18 | 358 | 1.14 | 0.91 | 74 | 9.8 |
| Example 5 | Hydrogenated Dimeric Decarboxylated Rosin | 55 | 104 | 1 | 1.012 | 9 | 406 | 1.09 | 0.81 | 80.7 | 10.1 |
| Example 6 | Dimeric Decarboxylated Rosin | 25 | 77 | 2 | 1.022 | >18 | 350 | 1.18 | 0.85 | 82 | 4.8 |
| Example 7 | Dimeric Decarboxylated Rosin | 61 | 107 | 4 | 1.000 | >18 | 535 | 1.34 | 0.62 | 59 | 17.7 |
| Example 8 | Dimeric Decarboxylated Rosin | 65 | 112 | 3 | 1.031 | >18 | 578 | 1.32 | 0.58 | 20 | 76.3 |
| Example 9 | Hydrogenated Dimeric Decarboxylated Rosin | 43 | 93 | 3 | 1.013 | 10 | 369 | 1.08 | 0.86 | 85.4 | 6.1 |
| Example 10 | Dimeric Decarboxylated Rosin | 49 | 99 | 3 | 1.021 | >18 | 407 | 1.15 | 0.79 | 82.9 | 13 |

TABLE 2

| Component (phr) | R-1 | R-2 | R-3 | R-4 | E-1 | E-2 | E-3 | E-4 | E-5 | E-6 | E-7 | E-8 | E-9 | E-10 |
|---|---|---|---|---|---|---|---|---|---|---|---|---|---|---|
| SSBR (1) | 60 | 60 | 60 | 60 | 60 | 60 | 60 | 60 | 60 | 60 | 60 | 60 | 60 | 60 |
| BR (2) | 20 | 20 | 20 | 20 | 20 | 20 | 20 | 20 | 20 | 20 | 20 | 20 | 20 | 20 |
| NR (3) | 20 | 20 | 20 | 20 | 20 | 20 | 20 | 20 | 20 | 20 | 20 | 20 | 20 | 20 |
| Silica (4) | 80 | 80 | 80 | 80 | 80 | 80 | 80 | 80 | 80 | 80 | 80 | 80 | 80 | 80 |
| Carbon black (5) | 10 | 10 | 10 | 10 | 10 | 10 | 10 | 10 | 10 | 10 | 10 | 10 | 10 | 10 |

TABLE 2-continued

| Component (phr) | R-1 | R-2 | R-3 | R-4 | E-1 | E-2 | E-3 | E-4 | E-5 | E-6 | E-7 | E-8 | E-9 | E-10 |
|---|---|---|---|---|---|---|---|---|---|---|---|---|---|---|
| Silane (6) | 8 | 8 | 8 | 8 | 8 | 8 | 8 | 8 | 8 | 8 | 8 | 8 | 8 | 8 |
| Zinc oxide (7) | 3 | 3 | 3 | 3 | 3 | 3 | 3 | 3 | 3 | 3 | 3 | 3 | 3 | 3 |
| Stearic acid (8) | 2 | 2 | 2 | 2 | 2 | 2 | 2 | 2 | 2 | 2 | 2 | 2 | 2 | 2 |
| IPPD (9) | 1 | 1 | 1 | 1 | 1 | 1 | 1 | 1 | 1 | 1 | 1 | 1 | 1 | 1 |
| 6PPD (10) | 2 | 2 | 2 | 2 | 2 | 2 | 2 | 2 | 2 | 2 | 2 | 2 | 2 | 2 |
| TMQ (11) | 0.5 | 0.5 | 0.5 | 0.5 | 0.5 | 0.5 | 0.5 | 0.5 | 0.5 | 0.5 | 0.5 | 0.5 | 0.5 | 0.5 |
| Wax (12) | 1 | 1 | 1 | 1 | 1 | 1 | 1 | 1 | 1 | 1 | 1 | 1 | 1 | 1 |
| Oil (13) | 2.5 | 2.5 | 2.5 | 2.5 | 2.5 | 2.5 | 2.5 | 2.5 | 2.5 | 2.5 | 2.5 | 2.5 | 2.5 | 2.5 |
| Reference 1 | 20 | — | — | — | — | — | — | — | — | — | — | — | — | — |
| Reference 2 | — | 20 | — | — | — | — | — | — | — | — | — | — | — | — |
| Reference 3 | — | — | 20 | — | — | — | — | — | — | — | — | — | — | — |
| Reference 4 | — | — | — | 20 | — | — | — | — | — | — | — | — | — | — |
| Example 1 | — | — | — | — | 20 | — | — | — | — | — | — | — | — | — |
| Example 2 | — | — | — | — | — | 20 | — | — | — | — | — | — | — | — |
| Example 3 | — | — | — | — | — | — | 20 | — | — | — | — | — | — | — |
| Example 4 | — | — | — | — | — | — | — | 20 | — | — | — | — | — | — |
| Example 5 | — | — | — | — | — | — | — | — | 20 | — | — | — | — | — |
| Example 6 | — | — | — | — | — | — | — | — | — | 20 | — | — | — | — |
| Example 7 | — | — | — | — | — | — | — | — | — | — | 20 | — | — | — |
| Example 8 | — | — | — | — | — | — | — | — | — | — | — | 20 | — | — |
| Example 9 | — | — | — | — | — | — | — | — | — | — | — | — | 20 | — |
| Example 10 | — | — | — | — | — | — | — | — | — | — | — | — | — | 20 |
| CBS (14) | 1.9 | 1.9 | 1.9 | 1.9 | 1.9 | 1.9 | 1.9 | 1.9 | 1.9 | 1.9 | 1.9 | 1.9 | 1.9 | 1.9 |
| DPG (15) | 2.5 | 2.5 | 2.5 | 2.5 | 2.5 | 2.5 | 2.5 | 2.5 | 2.5 | 2.5 | 2.5 | 2.5 | 2.5 | 2.5 |
| Sulphur (16) | 2.3 | 2.3 | 2.3 | 2.3 | 2.3 | 2.3 | 2.3 | 2.3 | 2.3 | 2.3 | 2.3 | 2.3 | 2.3 | 2.3 |
| Total: | 236.7 | 236.7 | 236.7 | 236.7 | 236.7 | 236.7 | 236.7 | 236.7 | 236.7 | 236.7 | 236.7 | 236.7 | 236.7 | 236.7 |

(1) SPRINT AN ™ SLR 4602 from TRINSEO
(2) BUNA ™ CB24 from ARLANXEO
(3) SMR10
(4) Ultrasil ™ 7000GR from Evonik
(5) CORAX ® N234 from Evonik
(6) Si-69 ® from Evonik
(7) Red Seal from Grillo
(8) Edenor ® ST4A GS from CALDIC
(9) VULKANOX ® 4010 from Lanxess
(10) VULKANOX ® 4020 from Lanxess
(11) VULKANOX ® HS from Lanxess
(12) Antilux ® 654 from Lanxess
(13) TDEA Vivatec 500 from Hansen&Rosenthal
(14) Rhenogran ™ CBS-80 from Rhein Chemie
(15) Rhenogran ™ DPG-80 from Rhein Chemie
(16) Rhenogran ™ IS 90-65 from Rhein Chemie

TABLE 3

|  | R-1 | R-2 | R-3 | R-4 | E-1 | E-2 | E-3 |
|---|---|---|---|---|---|---|---|
| Mooney Viscosity (MU) | 100 | 124 | 84 | 102 | 99 | 96 | 97 |
| T90 (Min) | 100 | 92 | 96 | 102 | 96 | 98 | 92 |
| Ttanδmax (° C.) | 100 | 125 | 161 | 99 | 106 | 106 | 100 |
| tanδ max (—) | 100 | 85 | 102 | 101 | 108 | 107 | 109 |
| tanδ at −20° C. (—) | 100 | 89 | 97 | 108 | 109 | 108 | 109 |
| tanδ at 0° C. (—) | 100 | 96 | 71 | 98 | 99 | 99 | 100 |
| tanδ at 30° C. (—) | 100 | 118 | 79 | 91 | 92 | 95 | 92 |
| tanδ at 60° C. (—) | 100 | 145 | 82 | 95 | 89 | 91 | 88 |
| G' at 60° C. | 100 | 111 | 96 | 108 | 91 | 96 | 91 |
| G" at 60° C. | 100 | 161 | 79 | 100 | 81 | 87 | 81 |
| wet grip to rolling resistance ratio (tanδ at 0° C./tanδ at 60° C.) | 1.00 | 0.66 | 0.86 | 1.03 | 1.12 | 1.09 | 1.13 |

|  | E-4 | E-5 | E-6 | E-7 | E-8 | E-9 | E-10 |
|---|---|---|---|---|---|---|---|
| Mooney Viscosity (MU) | 97 | 99 | 98 | 101 | 101 | 98 | 101 |
| T90 (Min) | 89 | 95 | 92 | 95 | 91 | 96 | 90 |
| Ttanδmax (° C.) | 97 | 112 | 115 | 109 | 101 | 109 | 101 |
| tanδ max (—) | 112 | 105 | 107 | 95 | 104 | 102 | 107 |
| tanδ at −20° C. (—) | 112 | 106 | 110 | 97 | 106 | 108 | 110 |
| tanδ at 0° C. (—) | 99 | 98 | 93 | 100 | 103 | 91 | 97 |
| tanδ at 30° C. (—) | 88 | 94 | 89 | 115 | 98 | 89 | 92 |
| tanδ at 60° C. (—) | 84 | 90 | 87 | 122 | 89 | 84 | 81 |
| G' at 60° C. | 84 | 97 | 89 | 98 | 90 | 100 | 79 |
| G" at 60° C. | 71 | 87 | 77 | 120 | 81 | 84 | 64 |
| wet grip to rolling resistance ratio (tanδ at 0° C./tanδ at 60° C.) | 1.17 | 1.09 | 1.07 | 0.82 | 1.16 | 1.08 | 1.20 |

As used herein, the term "comprising" means including elements or steps that are identified following that term, but any such elements or steps are not exhaustive, and an embodiment can include other elements or steps.

The invention claimed is:

1. A rubber composition comprising a blend of:
a rubber component and based on 100 parts by weight (phr) of the rubber component;
from 50 to 200 phr of a filler;
from 0 to 25 phr of a plasticizer;
from 5 to 90 phr dimeric decarboxylated rosin (DDCR) resin comprising 50 to 100 wt. % of polycyclic hydrocarbon compounds having one or more aliphatic, unsaturated or aromatic groups, and 34-80 carbon atoms;
wherein the DDCR has:
a molecular weight $M_n$ of 250-900 Da, measured using gel permeation chromatography and polystyrene calibration standards;
a polydispersity index of 1.0-1.35; and
an oxygen to carbon ratio of <5%;
wherein the DDCR is formed by decarboxylating a dimeric rosin acid or by dimerizing a decarboxylated rosin.

2. The rubber composition of claim 1, wherein the DDCR resin is characterized as having one or more of:
an acid value of <80 mg KOH/g, measured using ASTM D 465;
a flash point of >150° C. per ASTM D 92;
a ring and ball softening point (Tsp) from >30° C., per ASTM E28-18;
a Brookfield viscosity of 15-1000 mPa·s, at 177° C. ASTM D2196;
a glass transition temperature (Tg) of −20-110° C., per ASTM E1356;
a density of 1.00-1.05 g/cm³ per ASTM D792-13;
a $T_g/M_n$ (K/Da) ratio of >0.6; and
a cloud point in polyolefins of <70° C.

3. The rubber composition of claim 1, wherein the DDCR resin comprises dimeric and trimer species, with a sum of the dimer and trimer species of >=75 wt. %.

4. The rubber composition of claim 1, wherein the DDCR resin comprises >=50 wt. % dimeric species, and remainder monomeric, trimeric, and larger polymeric species.

5. The rubber composition of claim 1, wherein the DDCR resin comprises >=50 wt. % trimeric species, and remainder monomeric, dimeric, and larger polymeric species.

6. The rubber composition of claim 1, wherein the DDCR resin has a polydispersity index (PDI) (GPC) of 1.05-1.2.

7. The rubber composition of claim 1, wherein the DDCR resin has a $T_g/M_n$ ratio (K/Da) of 0.6-1.0.

8. The rubber composition of claim 1, wherein the DDCR resin has an oxygen content ratio of <3%.

9. The rubber composition of claim 1, wherein the DDCR resin has an acid value of <50 mg KOH/g.

10. The rubber composition of claim 1, wherein the DDCR resin is unhydrogenated, partially hydrogenated or fully hydrogenated.

11. The rubber composition of claim 1, wherein the rubber composition is extruded, compression molded, injection molded, or laminated into a molded rubber part.

12. A method for preparing a tire rubber composition comprising:
providing 0-100 parts by weight (phr) of a rubber component,
providing from 5-75 phr of a dimeric decarboxylated rosin (DDCR) comprising 50-100 wt. % of polycyclic hydrocarbon compounds having one or more aliphatic, unsaturated, or aromatic groups, and 34-80 carbon atoms, having:
a molecular weight $M_n$ of 250-900 Da, measured using gel permeation chromatography and polystyrene calibration standards;
a polydispersity index of 1.0-1.35; and
an oxygen to carbon ratio of <5%;
wherein the DDCR is formed by decarboxylating a dimeric rosin acid or by dimerizing a decarboxylated rosin;
providing from 50-200 phr of a filler, and optionally up to 75 phr of a plasticizer;
mixing the rubber component, the DDCR resin, the filler, and the optional plasticizer to form a mixture;
kneading the mixture; and
incorporating a cross-linking system into the kneaded mixture to form the tire rubber composition.

13. The method of claim 12, wherein the DDCR resin is characterized as having one or more of:
an acid value of <80 mg KOH/g, measured using ASTM D 465;
a flash point of >150° C. per ASTM D 92;
a ring and ball softening point ($T_{sp}$) from >30° C., per ASTM E28-18;
a Brookfield viscosity of 15-1000 mPa·s, at 177° C. ASTM D2196;
a glass transition temperature (Tg) of −20-110° C., per ASTM E1356;
a density of 1.00-1.05 g/cm³ per ASTM D792-13;
a $T_g/M_n$ (K/Da) ratio of >0.6; and
a cloud point in polyolefins of <70° C.

14. The method of claim 12, wherein the DDCR resin comprises dimeric and trimer species, with a sum of the dimer and trimer species of >=75 wt. %.

15. The method of claim 12, wherein the DDCR resin comprises a sum of dimeric and trimeric species of >=75 wt. %.

16. The method of claim 12, wherein the DDCR resin has a polydispersity index (PDI) (GPC) of 1.05-1.15.

17. The method of claim 12, wherein the DDCR resin has a $T_g/M_n$ ratio (K/Da) of 0.6-1.0.

18. The method of claim 12, wherein the DDCR resin has an oxygen content ratio of <3%.

19. The method of claim 12, wherein the DDCR resin has an acid value of <50 mg KOH/g.

20. The method of claim 12, wherein the DDCR resin is unhydrogenated, partially hydrogenated or fully hydrogenated.

* * * * *